United States Patent [19]

Ness

[11] Patent Number: 5,767,788
[45] Date of Patent: Jun. 16, 1998

[54] COMPUTER AIDED DISPATCH AND LOCATOR CELLULAR SYSTEM

[76] Inventor: James C. Ness, 7376 Ashley Shores Cir., Lake Worth, Fla. 33467

[21] Appl. No.: 797,287

[22] Filed: Feb. 7, 1997

Related U.S. Application Data

[63] Continuation-in-part of Ser. No. 617,540, Mar. 19, 1996.

[51] Int. Cl.$^6$ ............................................. G08B 23/00
[52] U.S. Cl. ..................... 340/825.49; 340/825.35; 340/505; 340/568; 340/572; 340/573; 340/539; 340/540; 455/11.1; 455/456; 455/457; 342/450; 342/457
[58] Field of Search ................ 340/825.49, 825.35, 340/505, 568, 572, 573, 539, 540, 825.36; 342/353, 357, 450, 454, 457, 463; 455/11.1, 456, 457; 364/449.1, 460, 516

[56] References Cited

U.S. PATENT DOCUMENTS

| | | | |
|---|---|---|---|
| 4,468,656 | 8/1984 | Clifford et al. | 340/539 |
| 4,743,892 | 5/1988 | Zayle | 340/573 |
| 4,891,650 | 1/1990 | Sheffer | 342/457 |
| 4,926,496 | 5/1990 | Cole et al. | 455/77 |
| 5,032,845 | 7/1991 | Velasco | 342/457 |
| 5,055,851 | 10/1991 | Sheffer | 342/457 |
| 5,208,756 | 5/1993 | Song | 364/449 |
| 5,218,344 | 6/1993 | Ricketts | 340/573 |
| 5,218,367 | 6/1993 | Sheffer | 342/457 |
| 5,438,321 | 8/1995 | Bernard et al. | 340/573 |
| 5,461,390 | 10/1995 | Hoshen | 342/419 |
| 5,504,474 | 4/1996 | Libman et al. | 340/572 |
| 5,552,772 | 9/1996 | Janky et al. | 340/573 |
| 5,629,678 | 5/1997 | Gargano et al. | 340/573 |

*Primary Examiner*—Michael Horabik
*Assistant Examiner*—Yonel Beaulieu
*Attorney, Agent, or Firm*—Alvin S. Blum

[57] ABSTRACT

A cellular phone type network tracks public safety workers and their vehicles for computer aided dispatching and automatic vehicle and personnel locating. A worker carried repeater unit communicates by radio with nearby cells, sending periodic identifying signals. The network locates the unit position by methods used for 911 caller locating. A vehicle mounted mobile data terminal with input and display is in short range wireless communication with the repeater unit to communicate therethrough with the network. A panic button on the repeater unit initiates rapid emergency signals to the network to both call for help and locate the worker/vehicle.

3 Claims, 1 Drawing Sheet

COMPUTER AIDED DISPATCH AND LOCATOR CELLULAR SYSTEM

This application is a continuation in part of copending patent application Ser. No. 08/617,540 filed Mar. 19, 1996 by the applicant and incorporated herein by reference.

FIELD OF THE INVENTION

This invention relates to devices and methods for computer aided dispatching and tracking the location of emergency vehicles, and more particularly, to such systems that incorporate cellular telephone technology for information transfer and location determination of vehicle and operator.

BACKGROUND OF THE INVENTION

With the explosion of computer technology over the past several years, there have been significant improvements in the use of computers for the dispatching of emergency public safety equipment and personnel. These Computer Aided Dispatch (CAD) systems can efficiently track public safety equipment and determine the most appropriate unit to dispatch to an emergency scene. The selection and routing of emergency equipment is made possible by the use of Automatic Vehicle Locating (AVL) systems which continually monitor the location of the emergency vehicles and report their location coordinates to the dispatch computers. By knowing the exact location of each emergency vehicle, the computer can efficiently select the most appropriate and closest vehicle to respond to an emergency. These systems can also provide the most effective routing of the vehicles based upon traffic conditions, weather, road closures, etc. Prior art utilizes the military's Global Positioning System (GPS) to provide the locating coordinates to the CAD computers. The use of GPS for AVL purposes requires a separate system apart from the CAD system. These GPS systems commonly consist of a GPS receiver, antenna, and transmitter used to transmit the GPS positions to the CAD computers in dispatch. Each vehicle that is a part of the CAD system fleet must have a separate GPS system on board in order to provide the data necessary for the complete CAD system to function. While the use of GPS technology does provide accurate locating data to the CAD computers, there are some inherent problems with the current systems aside from the cost of the GPS receivers. GPS systems rely upon the radio signals transmitted from satellites in orbit 11,000 miles in space. In order for the system to work, it is necessary to have clear reception from a minimum of three satellites at the same time. Since the signals are so weak, it does not take much interference to block those signals. Should a unit be under a stand of trees or beside a building, the signals could be blocked thus disabling the unit's ability to provide locating coordinates. Without the location coordinates the CAD system cannot provide the dispatching capabilities it was designed for and that the public safety officials depend on.

Along with the expansion of these CAD systems there has been the increased use of Mobile Data Terminals (MDT) to link the field units directly into the CAD system computers. Lap top computers are being installed in public safety vehicles to provide real time data links to the public safety data bases and CAD system information programs available to the police and fire/rescue personnel. Police are able to have real time access to state and national crime data bases regarding a vehicle tag number or a suspect's name and social security number. These secure encrypted data links provide immediate direct access to information right on the spot. No longer is it necessary to verbally request information that must be then typed into a computer and then read back to the officer in the field. Time delays and errors are virtually eliminated. Many dispatch centers currently have personnel whose sole function is to receive these verbal requests and report back to the officers. The old system is expensive, inaccurate, inefficient, non-secure, and slow. Police officers often need information quickly that is accurate, and confidential. The use of the MDTs provides just such a link that can be secured and swift. To provide these radio links to the MDTs, a number of programs have been developed. The original radio links consisted of a dedicated radio transceiver and radio modem mounted in the police vehicle. The lap top computer would be attached to the modem which would in turn be connected to the transceiver. Each police car had to have a separate radio system to link the units to the base computer. The receivers which received these computer links had to be installed in the city where the system was in operation. A separate system of antennae and radio receivers had to be installed to allow the base computers to "talk" to the individual police cars. Of course this system required a large amount of capital outlay and maintenance to allow it to function. With the development of new technologies in wireless communications, a new system of radio linking has become available to the public safety sector. The use of Cellular Digital Packet Data (CDPD) has been used with great success to provide the linkage to these mobile computer systems. Information is packaged in these "data packets" and transmitted via the modem along radio frequency channels that are shared with cellular voice transmissions. The CDPD technology allows for large amounts of data to be exchanged between computers while using existing cellular/wireless communications systems. These CDPD systems have begun to gain wide acceptance in the field of CAD system MDT systems. AT&T wireless service has begun actively marketing its own system of CDPD called the AirData network. This system is currently in use by a number of public safety organizations and has enjoyed an excellent reputation for economy and efficiency. It is projected that given the high cost of developing their own radio linking networks, most public safety agencies will opt for leasing space on already existing wireless systems.

In October of 1994, the FCC submitted a Notice of Proposed Rule Making (cc Docket No. 94-102) that would require all wireless network operators to be able to accurately locate the site of any 911 cellular telephone callers. This proposal was recently passed by the FCC requiring a system of locating technologies to be online within five years. A number of companies, such as Sanders, a Lockheed Martin Company based in Nashua, N.H., have been working on the technology to make this system work. Using standard triangulation locating technology such as Time of Arrival and Angle of arrival, several programs have already been developed where the location of a cellular caller can be pinpointed within 100 feet of their actual location. Using new technologies and systems, such as phase differencing techniques, accuracies down to 5 feet are seen. These locating systems will soon be an integral part of every 911 dispatch system throughout the country.

Prior art show a number of patents have been issued that utilize the cellular telephone system to generate location coordinates of the transmitter for various purposes. Several systems have the locating system built into the actual mobile system itself (Song, U.S. Pat. No. 5,208,756; Sheffer, Thompson U.S. Pat. No. 5,218,367). The determination of the location of the vehicle/receiver is made by measurements taken and calculations made in the vehicle at the location site, i.e. signal strength, transmitting power, trilateralization, arculation. The devices in these cases are attempting to find their own location by analyzing the signals being received by them from the cellular tower transmitters. Having the system to locate the cellular transmitter coordinates built into the vehicle's system is redundant, expensive and inaccurate. Each vehicle requires sophisticated hardware and software employed to interpret the signals received from the cellular transmitter/receiver towers. Another system patented by Sheffer, U.S. Pat. No. 4,891,650, and again in continuation of U.S. Pat. No. 4,891,650. U.S. Pat. No. 5,055,851 describes a system of vehicle locating that also utilizes the cellular telephone network. This system is used to locate vehicles as a part of an alarm system both contained within the automobile and also a part of an alarm company system. The trigger which causes the transmitter to emit its signal is based upon a criminal breaking into or stealing the automobile. The locating system used to determine the site of the transmitter relies solely on the signal strength of the transmitted locator signal as received by the cellular tower antenna. This system does not allow the signal to be activated by any outside means. This system depends on a sophisticated security system to be installed in the auto that is attached to the radio locating system. Should a criminal be able to by-pass this alarm system, the locating system will not work. Relying on signal strength solely as the means of locating the cellular transmitter is an ineffective means for location determination. Requiring an expensive alarm system be installed in order to activate the transmitter and having an alarm company locate the missing vehicle all add to the cost of this system. None of these systems makes any reference to the use of AVL/CAD system interface.

SUMMARY OF THE INVENTION

The wide spread implementation of this government mandated system of enhanced cellular/wireless 911 locating technology is utilized by the instant invention to provide an enhanced and expanded CAD/AVL system.

My system of vehicle locating utilizes this built in system of cellular/wireless transmitter locating to provide the AVL information to the dispatch computers. It is efficient, effective, and practical to utilize the software and system that provide the mobile data transfer for the CAD system, to also provide the vehicle locating coordinates needed for the AVL system. Not only will my system provide an economical and practical means for supplying AVL information to the CAD computers. It also permits tracking the vehicle operator when separated from the vehicle employing technology disclosed in my copending parent application. My system uses the signals received by the plurality of cellular towers as the source of locating information. This improved method for locating signals utilizes techniques such as interpretations of cellular signal strength, timing of signal reception, angle of reception. These methods of transmitter locating technology will be the same as used in meeting the FCC requirements for cellular 911 caller identification. One central locating system is available for all transmitters, 911 cellular callers and AVL signals. Each vehicle added to the CAD fleet will automatically be located without the need for additional expense equipment, the very radio link that transfers the CAD information to and from the vehicles will provide the locating signals for this cellular/AVL system. My system has the following features and advantages:

1. Extreme efficiency—utilizes existing hardware and software of enhanced 911 CAD systems.

2. Accurate—avoids problems that GPS systems can have, such as loss of signals.

3. Inexpensive—does not require the additional expenses of GPS receivers or 911 locators for each vehicle.

4. Widespread coverage and standardization of system would allow police and fire units to be tracked even when outside of their own jurisdiction, i.e. police chasing a stolen car through several communities, dispatchers in each community would be able to track every police unit involved in the pursuit regardless of their organization.

5. Monitor location of officer even if away from vehicle. The computer is coupled by short range radio to the cellular transceiver. The transceiver stays with the officer when away from the vehicle and is tracked by the system.

These and other objects, advantages and features of the invention will become more apparent when the detailed description is studied in conjunction with the drawings in which like reference characters designate like elements.

DETAILED DESCRIPTION OF PREFERRED EMBODIMENTS

Figure 3:
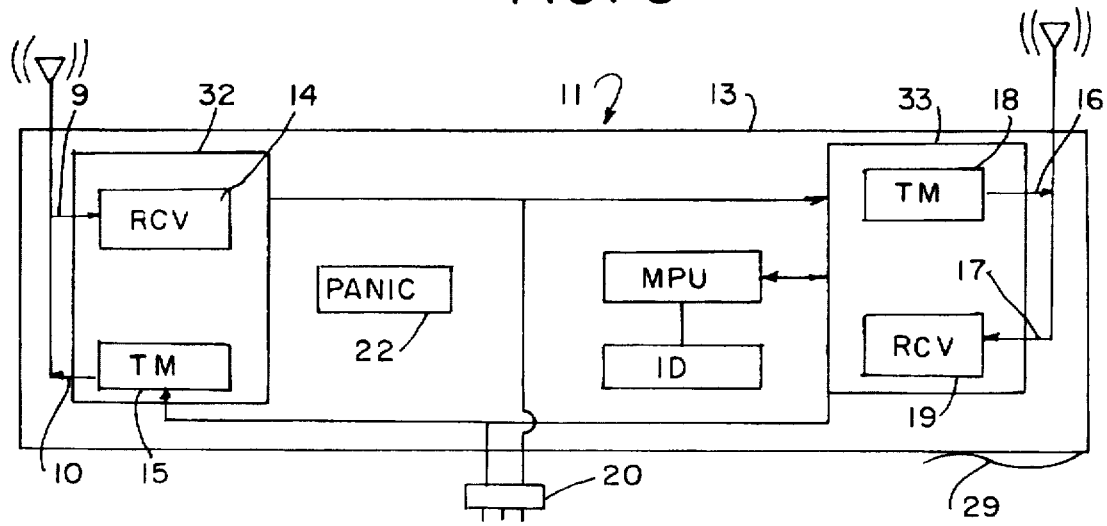
FIG. 3 is a diagrammatic representation of a personnel cellular transceiver repeater unit of the invention.
Figure 1:
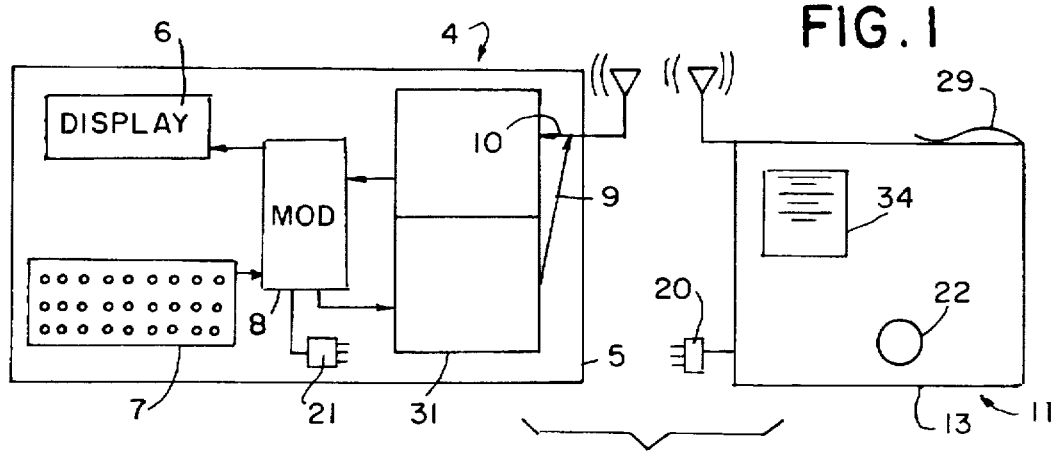
FIG. 1 is a diagrammatic representation of the vehicular computer aided dispatch device and officer worn cellular transceiver locator combination.
Figure 2:
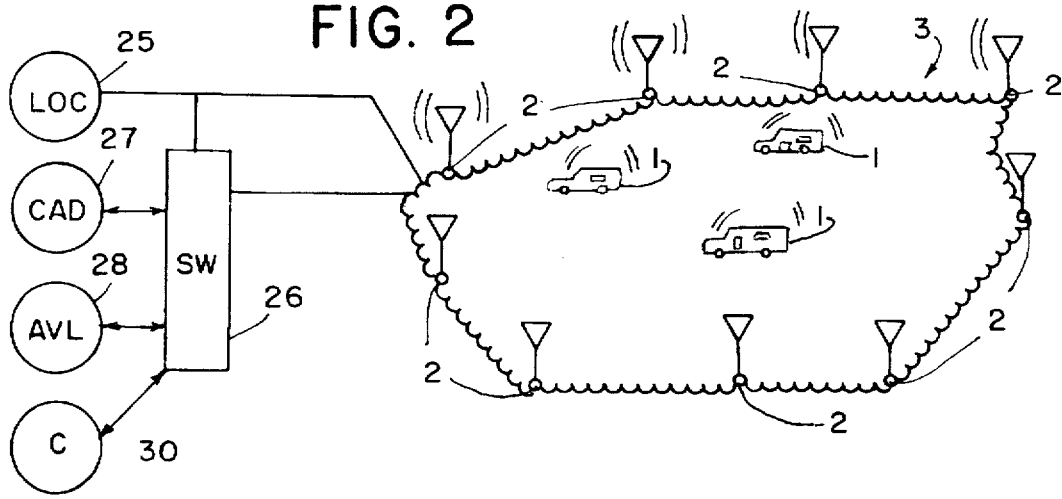
FIG. 2 is a diagrammatic representation of the complete CAD/AVL system.

Referring now to the drawing figures, a network 3 of interconnected radio frequency electromagnetic radiation transceiver cells 2 are provided. These may be of the type currently in use for cellular telephone systems, or existing cellular telephone networks may be used for the instant invention to reduce cost of implementation.

A plurality of emergency vehicles 1 such as police cars, emergency medical rescue vans, and the like that must be in contact with information services such as a computer aided dispatch service (CAD) 27, automatic vehicle locator (AVL) 28, and a computer information source (C) 30 are each provided with a mobile data terminal (MDT) 4. This terminal may be powered by the vehicle or a battery (not shown). It includes a first housing 5 with information input means such as the keyboard 7 connected to a modem 8 and a transceiver 31 for transmitting an electromagnetic radiation (EM) signal 9 of short range such as the radio frequency (RF) signal used to open a garage door or the infrared (IR) signal on a TV remote control. The transceiver also receives electromagnetic radiation 10 and sends information therefrom through modem 8 to the display 6 such as one of those well known in the laptop computer art for communicating information to the emergency worker.

Each emergency worker may be provided with a personnel cellular transceiver unit 11 (PCTU). The (PCTU) has a housing 13 that encloses therein a first (EM) transceiver module 32 for receiving the (EM) signal 9 from the (MDT) in receiver 14 and for transmitting the (EM) signal 10 to the (MDT) through the transmitter 15. The (PCTU) is provided with a pocket clip 29 so that it may be carried on the person either inside or outside the vehicle and be in communication with the (MDT) without direct connection. A second transceiver 33 has a transmitter 18 for sending (RF) signals to the network cells 2 and a receiver 19 for receiving (RF) signals from the cells 2. The (PCTU) has a microprocessor controller 24 for periodically sending identifying signals encoded with unique identification information from ID storage 23 at regular intervals through transmitter 18 to the cells 2. A locator 25 connected to the network of cells performs the locating function on signals 16 received by the cells from the transmitter 18 to track personnel. This locating function may be one of the processes known in the art for locating a cellular phone when sending a 911 call. An automatic vehicle locator (AVL) 28, a computer aided dispatch system (CAD) 27, and a remote or directly connected computerized data source (c) 30 are interconnected to the network 3 and the locator 25 through routing switch 26. All the necessary information that the (MDT) requests through the (PCTU) are sent through cells 2 that are closest to the (PCTU), much like the cellular phone system, to the PCTU on (RF) signal 17 that is received by receiver 19. The (PCTU) acts as a repeater, sending the information over the short range (EM) signal to the (MDT) and relaying information received via (EM) signal from the (MDT) by transmitting it on RF to the cells 2. The (PCTU) is provided with a panic button or alarm 22 that increases the frequency of transmissions 16 to the cells 2 and signals an emergency situation. The dispatch system is thus alerted as to which person needs help and where the person is located. This leaves the person free to attend to the emergency while the emergency message is continually broadcast.

The (EM) communication between (MDT) and (PCTU) may optionally be bypassed by connectors 21 and 20 directly physically connecting transceiver 31 with transceiver 33 while the person is in the vehicle to conserve battery 34 in the (PCTU).

In an alternate embodiment, the (PCTU) may be made without the (EM) transceiver 32 for use without the (MDT) for use as an automatic personnel locator (APL).

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention.

What is claimed is:

1. A system combining an automatic personnel locater (APL) with a mobile data terminal (MDT) for tracking public safety workers and for computer aided dispatching (CAD) and communicating with emergency vehicles associated with public safety workers, the system comprising:

A) a network of radio transceiver cells;

B) a plurality of mobile data terminals for installation in vehicle associated with public safety workers, each mobile data terminal (MDT) comprising a first housing enclosing:

1) means for information output display;
2) means for information input; and
3) means for generating a first electromagnetic radiation (EM) signal and modulating the (EM) signal with the input information and for receiving a second (EM) signal carrying output information for displaying the output information on the means for output display;

C) a plurality of personnel cellular transceiver repeater units for use within or outside said vehicles, each repeater unit comprising:

a second housing enclosing:

1) means for receiving the first (EM) signal and for transmitting the second (EM) signal for communicating with an (MDT) over a short distance;
2) means for receiving a third (EM) signal and for transmitting a fourth (EM) signal for communicating with the network of radio transceiver cells for communicating information between the (MDT) and the network;
3) means for repeatedly transmitting identifying data signals from said each repeater unit to the network;

D) means connected to the network for locating said each repeater unit from the identifying data signal received by the cells and generating personnel location data therefrom; and E) a computer aided dispatching and communicating means connected to the network for receiving the personnel location data and receiving and transmitting information to and from the (MDT) through the repeater units.

2. The system according to claim 1 further comprising:

means connected to the second housing for modulating the identifying data signals to provide evidence of emergency conditions.

3. A system combining an automatic personnel locator with a mobile data terminal (MDT) for tracking public safety workers and for computer aided dispatching and communicating with emergency vehicles associated with public safety workers, the system comprising:

A) a network of spaced apart radio transceiver cells;

B) a plurality of mobile data terminals for installation in vehicles associated with public safety workers, each mobile data terminal (MDT) comprising:

1) means for information output display;
2) means for information input;
3) means for generating a first electromagnetic radiation (EM) signal modulated with information input through said means for information input; and
4) means for receiving a second (EM) signal and demodulating therefrom output information modulated thereon for display of said output information on said means for information output display;

C) a plurality of personnel cellular transceiver repeater units for use inside or outside said vehicles, each personnel cellular transceiver repeater unit (PCTU) comprising a housing enclosing:

1) means for receiving said first (EM) signal and retransmitting the information thereon as a third (EM) signal for reception by said network of transceiver cells;
2) means for receiving a fourth (EM) signal transmitted from said network of transceiver cells and for retransmitting the information thereon as said second (EM) signal for reception by said (MDT);
3) means for repeatedly transmitting identifying data signals from the (PCTU) to the network; and
4) means for modifying the data signals to notify the network of emergency conditions;

D) means connected to the network for locating the position of the (PCTU) from the identifying data signals received by the radio transceiver cells and generating personnel location data and emergency condition information therefrom; and E) computer aided communication means connected to the network for receiving the personnel location data and communicating with the (PCTU).

* * * * *